US011537007B2

(12) United States Patent
Lee et al.

(10) Patent No.: US 11,537,007 B2
(45) Date of Patent: *Dec. 27, 2022

(54) LIQUID CRYSTAL DISPLAY

(71) Applicant: Samsung Display Co., Ltd., Yongin-Si (KR)

(72) Inventors: Kwang Keun Lee, Osan-si (KR); Young Min Kim, Yongin-si (KR); Hae Il Park, Seoul (KR); Seon-Tae Yoon, Seoul (KR); Jun Han Lee, Incheon (KR)

(73) Assignee: Samsung Display Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/145,432

(22) Filed: Jan. 11, 2021

(65) Prior Publication Data

US 2021/0132446 A1 May 6, 2021

Related U.S. Application Data

(63) Continuation of application No. 16/537,626, filed on Aug. 12, 2019, now Pat. No. 10,901,265, which is a continuation of application No. 14/936,401, filed on Nov. 9, 2015, now Pat. No. 10,423,032.

(30) Foreign Application Priority Data

Jan. 5, 2015 (KR) .................. 10-2015-0000727

(51) Int. Cl.
*G02F 1/13357* (2006.01)
*G02F 1/1335* (2006.01)

(52) U.S. Cl.
CPC .. *G02F 1/133617* (2013.01); *G02F 1/133504* (2013.01); *G02F 1/133614* (2021.01); *G02F 2202/36* (2013.01)

(58) Field of Classification Search
CPC ......... G02F 1/133617; G02F 1/133614; G02F 1/01791; G02F 2201/44; H01L 51/502; H01L 31/035218; H01L 51/5012; H05B 33/00

See application file for complete search history.

(56) References Cited

U.S. PATENT DOCUMENTS

| 7,750,984 | B2 | 7/2010 | Ha et al. |
| 8,277,064 | B2 | 10/2012 | Willemsen et al. |
| 2004/0012027 | A1 | 1/2004 | Keller et al. |
| 2007/0153175 | A1* | 7/2007 | Chang ............... G02F 1/133555 349/114 |
| 2010/0188615 | A1 | 7/2010 | Hung et al. |

(Continued)

FOREIGN PATENT DOCUMENTS

| JP | 2003-014918 A | 1/2003 |
| JP | 2010-078876 A | 4/2010 |

(Continued)

OTHER PUBLICATIONS

G. J. Heo et al., "Color PH-LCD Using STN Mode" ,IDW'98,pp. 221-224, 1998.

(Continued)

*Primary Examiner* — Mariam Qureshi
(74) *Attorney, Agent, or Firm* — Innovation Counsel LLP

(57) ABSTRACT

A liquid crystal display includes: a display panel; and a color conversion layer positioned on the display panel, wherein the color conversion layer includes a scattering layer including a color conversion media layer and scatterers.

17 Claims, 12 Drawing Sheets

(56) References Cited

U.S. PATENT DOCUMENTS

| | | |
|---|---|---|
| 2012/0087107 A1 | 4/2012 | Kunimasa et al. |
| 2013/0335799 A1 | 12/2013 | Yoon et al. |
| 2014/0063413 A1* | 3/2014 | Kim .................. G02F 1/133514 |
| | | 349/65 |
| 2014/0160408 A1 | 6/2014 | Cho et al. |
| 2014/0321101 A1 | 10/2014 | Kadowaki |
| 2015/0077966 A1 | 3/2015 | Bessho et al. |
| 2015/0205159 A1* | 7/2015 | Itou .................. G02F 1/133617 |
| | | 349/110 |
| 2015/0285969 A1 | 10/2015 | Kim et al. |
| 2015/0323711 A1* | 11/2015 | Bessho ................ G02B 5/0242 |
| | | 349/71 |
| 2016/0320665 A1 | 11/2016 | Cho et al. |
| 2016/0357039 A1 | 12/2016 | Kim et al. |

FOREIGN PATENT DOCUMENTS

| | | |
|---|---|---|
| JP | 2013-254651 A | 12/2013 |
| KR | 10-2012-0048218 A | 5/2012 |
| KR | 10-2014-0113046 A | 9/2014 |

OTHER PUBLICATIONS

Swie Lan Njo et al., "23:3: Light-Efficient Liquid Crustal Displays Using Photoluminescent Color Filters", SID 00 Digest, pp. 343-345, 2000.

Jeong Rok Oh et al., "Highly efficient-color display based on blue LED backlight and electrochromic light-valve coupled with front-emitting phosphors", Optics Express, vol. 19, No. 17, pp. 16022-16031, 2011.

\* cited by examiner

LIQUID CRYSTAL DISPLAY

CROSS-REFERENCE TO RELATED APPLICATION

This application is a continuation application of U.S. patent application Ser. No. 16/537,626 filed on Aug. 12, 2019, which is a continuation application of U.S. patent application Ser. No. 14/936,401 filed Nov. 9, 2015 (now U.S. Pat. No. 10,423,032), which claims priority to and the benefit of Korean Patent Application No. 10-2015-0000727, filed on Jan. 5, 2015, in the Korean Intellectual Property Office, the disclosure of which is incorporated herein in its entirety by reference.

BACKGROUND

(a) Field of the Invention

The present invention relates to a liquid crystal display.

(b) Description of the Related Art

Liquid crystal displays (LCD) are one of the most widely used flat panel displays at present, and include two display panels on which electrodes are disposed, and a liquid crystal layer disposed between the two display panels. The liquid crystal display controls an amount of light to be transmitted by applying a voltage to the electrodes and rearranging liquid crystal molecules of the liquid crystal layer.

Among the liquid crystal displays, a structure in which an electric field generating electrode is provided in each of two display panels is mainly used at present. Among them, a structure in which a plurality of thin film transistors and pixel electrodes are arranged with a column form in one display panel (hereinafter, referred to as a 'thin film transistor display panel'), red, green and blue color filters are disposed in the other display panel (hereinafter, referred to as a 'common electrode display panel'), and an overall surface of the common electrode display panel is covered with the common electrode is mainly formed.

However, light loss occurs in a polarizing plate and color filters in the liquid crystal display. In order to implement the liquid crystal display having reduced light loss and high efficiency, a photo-luminescent liquid crystal display (PL-LCD) including color conversion materials has been suggested.

The PL-LCD uses a color conversion media (CCM) instead of using the color filters, and when light emitted from a light source is supplied to the color conversion media, a portion of the light emitted from the light source may be diffused in a tilt direction and supplied to adjacent pixels. This phenomenon is referred to as an optical crosstalk, and has a problem in that color reproducibility is reduced.

The above information disclosed in this Background section is only for enhancement of understanding of the background of the invention and therefore it may contain information that does not form the prior art that is already known to a person of ordinary skill in the art.

SUMMARY

A liquid crystal display having advantages of increasing a front luminance and improving a light output efficiency by including a color conversion layer having a thin thickness is provided.

In one aspect, a liquid crystal display includes: a display panel; and a color conversion layer positioned on the display panel, wherein the color conversion layer includes a scattering layer including a color conversion media layer and scatterers.

The color conversion media layer may include any one of a phosphor and a quantum dot (QD).

The scatterer may include at least one selected from the group consisting of $TiO_2$, $ZrO_2$, $Al_2O_3$, $In_2O_3$, ZnO, $SnO_2$, $Sb_2O_3$ and ITO.

The scattering layer may have a refractive index larger than that of the color conversion media layer.

The scattering layer may have a refractive index of about 1.6 or more.

The liquid crystal display may further include a light assembly supplying light to the display panel and the color conversion layer.

The light assembly may be a light emitting diode (LED) emitting a specific wavelength band including ultraviolet rays or blue light.

The color conversion media layer may further include a red color conversion media layer and a green color conversion media layer.

The color conversion media layer may further include a blue color conversion media layer or a white color conversion media layer.

The color conversion layer may further include a light blocking member positioned between adjacent red color conversion media layers, adjacent green color conversion media layers, and adjacent blue color conversion media layers, or adjacent white color conversion media layers.

The scattering layer may be formed only below at least any one color conversion media layer selected from the group consisting of the red color conversion media layer, the green color conversion media layer, and the blue color conversion media layer.

The scatterers formed below the red color conversion media layer, the green color conversion media layer, and the blue color conversion media layer, respectively, may be different from each other.

The display panel may be positioned between the light assembly and the color conversion layer, and the scattering layer of the color conversion layer may contact the display panel.

In another aspect, a liquid crystal display includes: a display panel; a scattering layer positioned on the display panel; and a red color conversion media layer and a green color conversion media layer formed on the scattering layer to be spaced apart from each other by a light blocking member.

The liquid crystal display may further include a blue color conversion media layer or a white color conversion media layer positioned on the scattering layer.

The scattering layer may have a refractive index larger than that of the color conversion media layer.

In yet another aspect, a liquid crystal display includes: a display panel; a scattering layer positioned on the display panel; and a red color conversion media layer, a green color conversion media layer, and a blue color conversion media layer, formed on the scattering layer to be spaced apart from each other by a light blocking member, wherein the scattering layer is formed only below at least any one color conversion media layer selected from the group consisting of the red color conversion media layer, the green color conversion media layer, and the blue color conversion media layer.

The scattering layer may have a refractive index larger than that of the color conversion media layer.

Light output efficiency and color reproducibility are improved by the above-described liquid crystal display to thereby provide more improved display quality.

DETAILED DESCRIPTION OF THE EMBODIMENTS

Figure 1:
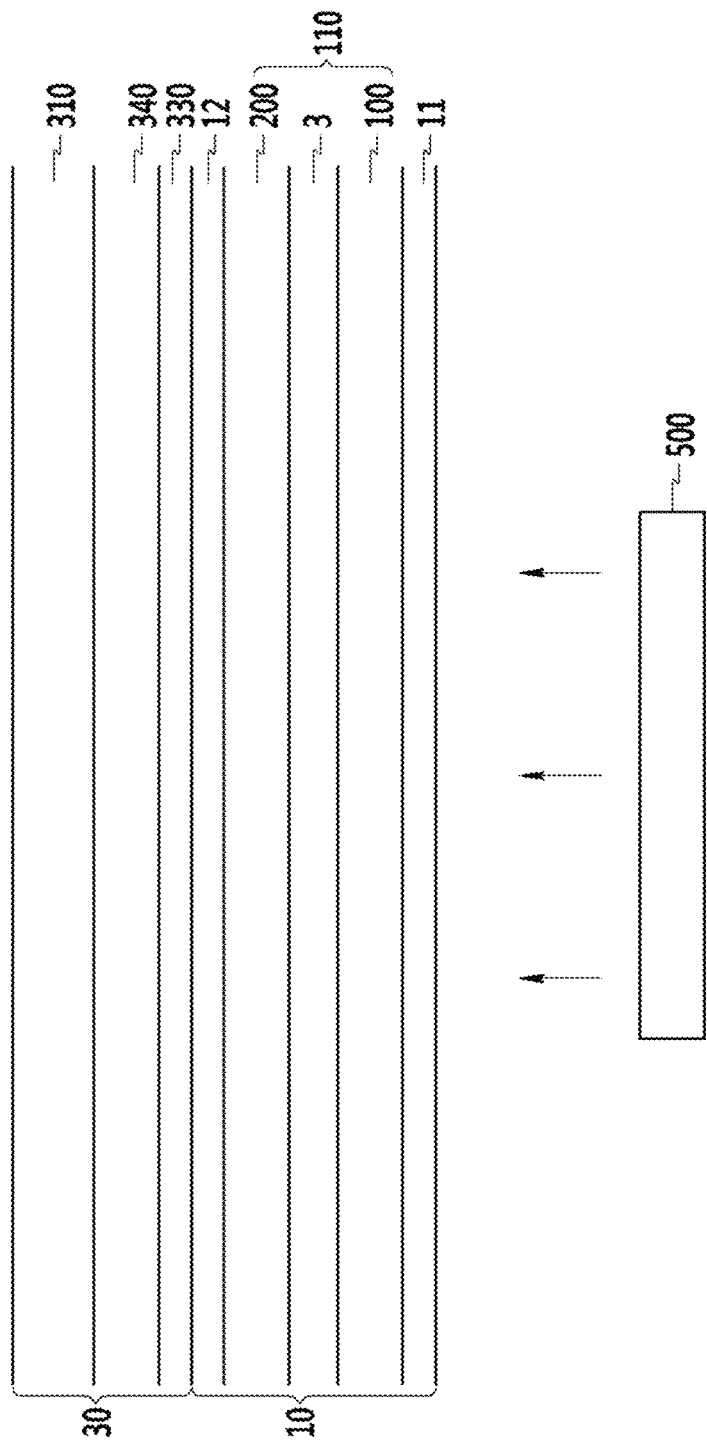
FIG. 1 is a schematic cross-sectional view of a liquid crystal display according to an example embodiment.

Example embodiments will be described more fully hereinafter with reference to the accompanying drawings, in which example embodiments are shown.

As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Hereinafter, a liquid crystal display according to an example embodiment of the present invention is described with reference to FIGS. 1 to 5. FIG. 1 is a schematic cross-sectional view of a liquid crystal display according to an example embodiment, and FIGS. 2 to 5 are cross-sectional views of a color conversion layer according to an example embodiment.

First, referring to FIG. 1, the display panel 10 may include a liquid crystal panel 110 displaying an image and polarizing plates 11 and 12 positioned on both surfaces of the liquid crystal panel 110.

The liquid crystal panel 110 includes a lower display panel 100 including a first insulation substrate, an upper display panel 200 including a second insulation substrate facing the first insulation substrate, and a liquid crystal layer 3 interposed between the lower display panel 100 and the upper display panel 200.

A plurality of pixel electrodes (not shown) in a matrix form are positioned on the first insulation substrate. Although not shown in the drawings, gate lines extended in a column direction, data lines extended in a row direction, and thin film transistors connected to a plurality of pixel electrodes in one to one correspondence may be disposed on the first insulation substrate.

A common electrode (not shown) is positioned on the second insulation substrate. The common electrode is positioned on the second insulation substrate and forms an electric field with the pixel electrodes.

The liquid crystal layer 3 includes a plurality of liquid crystal molecules and an alignment direction of the liquid crystal molecules is controlled by the electric field between the pixel electrode and the common electrode. An image may be displayed by controlling transmittance of light received from a light assembly 500 according to arrangement of the liquid crystal molecules.

Even though the liquid crystal display panel in which the liquid crystal panel 110 forms a vertical electric field is described in the present specification, the present invention is not limited thereto. That is, the display panel may be a plasma display panel (PDP), an organic light emitting diode display (OLED), a surface conduction electron-emitter display (SED), a field emission display (FED), a vacuum fluorescent display (VFD), and an electric paper (E-paper), and the like.

A first polarizing plate 11 and a second polarizing plate 12 for polarizing an incident light from the light assembly 500 are positioned on both surfaces of the liquid crystal panel 110.

In addition, the display panel according to an example embodiment is a liquid crystal panel, and the liquid crystal display may further include the light assembly 500 in addition to the first polarizing plate 11 and the second polarizing plate 12.

The light assembly 500 is positioned below the first polarizing plate 11, and may include a light source generating light and a light guide (not shown) receiving the light and guiding the received light toward a direction of the display panel 10 and a color conversion layer 30.

As an example of the present invention, the light assembly 500 may include at least one light emitting diode (LED) and the LED may be a blue light emitting diode (LED) as an example. The light source according to the present invention may be an edge typed light assembly disposed on at least one side surface of the light guide or may be a direct type in which the light source of the light assembly 500 is positioned underneath the light guide (not shown). However, the present invention is not limited thereto.

The color conversion layer 30 according to an example embodiment may be positioned on the display panel 10, and more specifically, may be positioned on the second polarizing plate 12, and may be in direct contact with the second polarizing plate 12.

Figure 2:
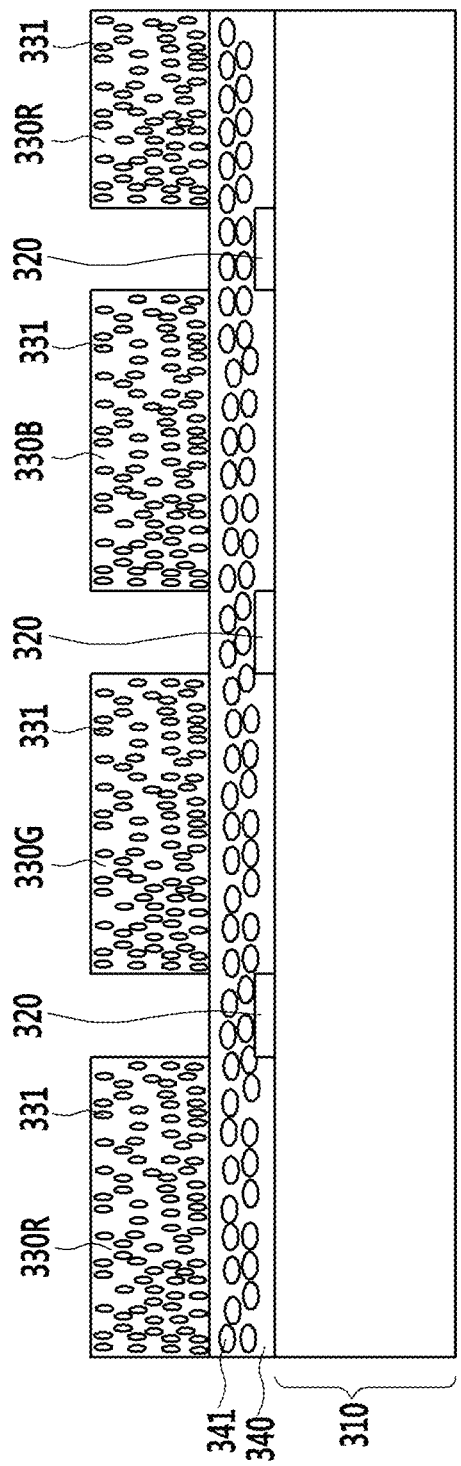
FIGS. 2, 3, 4 and 5 are cross-sectional views of a color conversion layer according to an example embodiment.

FIG. 2 is a cross-sectional view of the color conversion layer according to an example embodiment of the present invention. Specifically, FIG. 2 is a cross-sectional view of the color conversion layer in a case in which UV or nUV light source is applied as the light source of the light assembly.

Referring to FIG. 2, the color conversion layer 30 includes a scattering layer 340 including scatterers 341 positioned on the substrate 310 and a plurality of color conversion media layers 330R, 330G, and 330B formed on the scattering layer 340. As used herein, the term "scatterers" refers to an object or particle that scatters light incident onto the object or particle. In addition, the scattering layer 340 is formed on the substrate 310 and includes a light blocking member 320 positioned to be adjacent between the color conversion media layers 330R, 330G, and 330B.

The color conversion layer 30 according to an example embodiment further includes the scattering layer 340 coated on an overall surface of the substrate 310.

The scattering layer 340 may be formed by phase-separation with the color conversion media layer 330 in the manufacturing process of the color conversion layer 30.

The scatterers 341 according to an example embodiment may include at least one selected from the group consisting of $TiO_2$, $ZrO_2$, $Al_2O_3$, $In_2O_3$, ZnO, $SnO_2$, $Sb_2O_3$ and ITO, and the present invention is not limited thereto but any materials scattering the incident light may be used. The scatterers 341 allow the incident light to be scattered, thereby increasing a light output amount of light transmitting the color conversion layer 30.

The scattering layer 340 may have a refractive index larger than that of the color conversion media layer 330. Accordingly, the scattering layer 340 includes scatterers 341 having high refractive index, and specifically, the scatterers 341 according to an example embodiment have a refractive index of about 1.6 or more.

The scattering layer 340 including the scatterers 341 having the refractive index may allow a portion of the light to be output toward the color conversion media layer 330 again to thereby increase a light output efficiency. That is, the scattering layer 340 is formed below the color conversion media layer 330, such that an amount of light emitted from the light source that is totally reflected may be reduced.

The red color conversion media layer 330R includes a red phosphor, and the red phosphor may be at least one material of (Ca, Sr, Ba)S, $(Ca, Sr, Ba)_2Si_5N_8$, CASN($CaAlSiN_3$), $CaMoO_4$, and $Eu_2Si_5N_8$.

The green color conversion media layer 330G includes a green phosphor, and the green phosphor may be at least one material of yttrium aluminum garnet (YAG), $(Ca, Sr, Ba)_2SiO_4$, $SrGa_2S_4$, —SiAlON, —SiAlON, $Ca_3Sc_2Si_3O_{12}$, $Tb_3Al_5O_{12}$, $BaSiO_4$, CaAlSiON, and $(Sr_{1-x}Ba_x)Si_2O_2N_2$.

The blue color conversion media layer 330B includes a blue phosphor, the blue phosphor may be at least one material of 1-4-di-[4-(N,N-di-phenyl)amino]styryl-benzene (DSA-Ph), 4,4'-bis(9-ethyl-3-carbazovinylene)-1,1'-biphenyl (BCzVBi), and BAM($BaMgAl_{10}O_{17}:Eu_{2+}$).

In addition, the red color conversion media layer 330R, the green color conversion media layer 330G, and the blue color conversion media layer 330B may include a quantum dot 331 in which color is changed according to a size.

The color conversion layer 30 according to an example embodiment includes the color conversion media layer 330 and the scattering layer 340. Meanwhile, constituent elements of the color conversion media layer 330 and the scattering layer 340 may be different from each other according to colors of output light. That is, configurations of the color conversion media layer 330 and the scattering layer 340 may be different according to output regions of red color, green color, and blue color.

The quantum dot 331 may be selected from a Group II-VI compound, a Group IV-VI compound, a Group IV element, a Group IV compound and a combination thereof.

The Group II-VI compound may be selected from the group consisting of binary compounds, ternary compounds, and quaternary compounds, wherein the binary compounds are selected from the group consisting of CdSe, CdTe, ZnS, ZnSe, ZnTe, ZnO, HgS, HgSe, HgTe, MgSe, MgS and mixtures thereof, the ternary compounds are selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and mixtures thereof, and the quaternary compounds are selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe and mixtures thereof. The Group III-V compound may be selected from the group consisting of two element compounds, three element compounds, and four element compounds, wherein the two element compound is selected from the group consisting of GaN, GaP, GaAs, GaSb, AlN, AlP, AlAs, AlSb, InN, InP, InAs, InSb and mixtures thereof, the three element compound is selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP and mixtures thereof, and the four element compound is selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and mixtures thereof. The Group IV-VI compound may be selected from the group consisting of two element compounds, three element compounds, and four element compounds, wherein the two element compound is selected from the group consisting of SnS, SnSe, SnTe, PbS, PbSe, PbTe and mixtures thereof, the three element compound is selected from the group consisting of SnSeS, SnSeTe, SnSTe, PbSeS, PbSeTe, PbSTe, SnPbS, SnPbSe, SnPbTe and mixtures thereof, and the four element compound is selected from the group consisting of SnPbSSe, SnPbSeTe, SnPbSTe and mixtures thereof. The Group IV element may be selected from the group consisting of Si, Ge and mixtures thereof. The Group IV compound may be a two element compound selected from the group consisting of SiC, SiGe and mixtures thereof.

Here, the two element compound, the three element compound or the four element compound may be present in a particle at a uniform concentration, or may be divided in a state in which concentration distribution is partially different and present in the same particle. In addition, the quantum dot 331 may have a core/shell structure in which one quantum dot 331 surrounds another quantum dot 331. An interface between the core and the shell may have a concentration gradient in which a concentration of elements present in the shell is decreased toward the center.

The quantum dot 331 may have a full width of half maximum (FWHM) of light emitting wavelength spectrum of about 45 nm or less, preferably, about 40 nm or less, and more preferably, about 30 nm or less. In this range, color purity or color reproducibility may be improved.

In addition, a shape of the quantum dot 331 may be any shape which is generally used in the art, and is not specifically limited. Specifically, spherical, pyramid, multi-arm, or cubic shaped nano particles, nanotubes, nanowires, nano fibers, and nano plate particles may be used.

Figure 3:
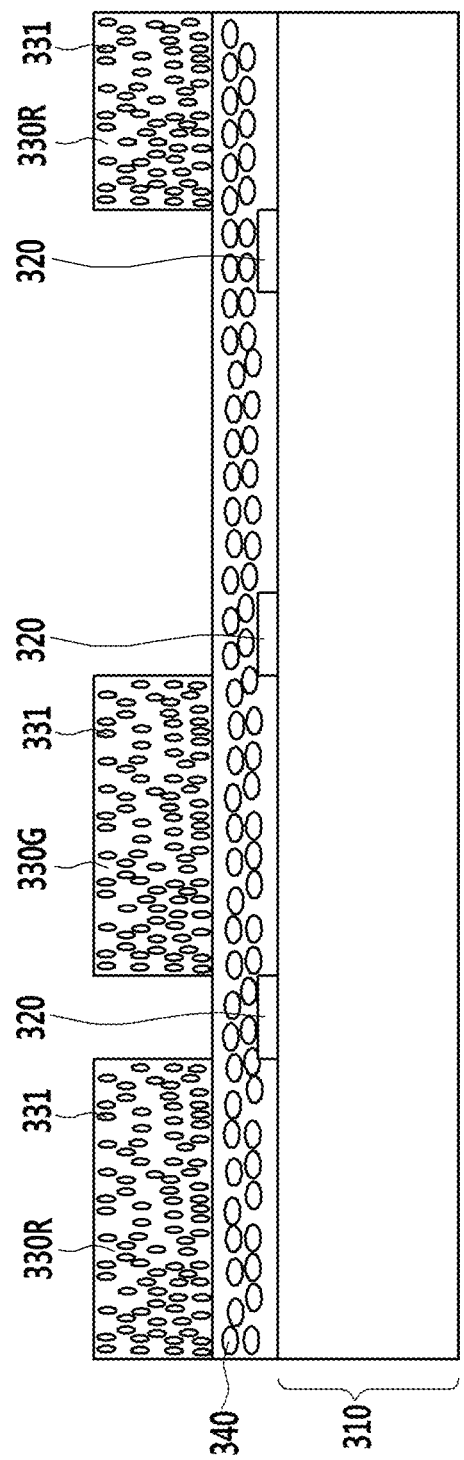

FIG. 3 is a cross-sectional view of the color conversion layer according to an example embodiment. Specifically, FIG. 3 is a cross-sectional view of the color conversion layer in a case in which a blue color light source is applied as the light source of the light assembly.

Referring to FIG. 3, the color conversion layer 30 includes the scattering layer 340 positioned on the substrate 310 and a plurality of color conversion media layers 330R and 330G formed on the scattering layer 340. In addition, the scattering layer 340 is formed on the substrate 310 and includes the light blocking member 320 positioned to be adjacent between the color conversion media layers 330R and 330G.

The color conversion layer 30 according to an example embodiment further includes the scattering layer 340 coated on an overall surface of the substrate 310. FIGS. 2 and 3 have the scattering layer 340 on the same surface of the substrate 310. The scattering layer 340 may be formed by phase-separation with the color conversion media layer 330 in the manufacturing process of the color conversion layer 30.

The scatterers 341 according to an example embodiment may include at least one selected from the group consisting of $TiO_2$, $ZrO_2$, $Al_2O_3$, $In_2O_3$, ZnO, $SnO_2$, $Sb_2O_3$ and ITO, and the present invention is not limited thereto but any materials scattering the incident light may be used. The scatterers allow the incident light to be scattered, thereby increasing a light output amount of light transmitting the color conversion layer 30.

The scattering layer 340 may have a refractive index larger than that of the color conversion media layer 330. Accordingly, the scattering layer 340 includes scatterers 341 having high refractive index, and specifically, the scatterers 341 according to an example embodiment of the present invention have a refractive index of about 1.6 or more.

The scattering layer 340 including the scatterers 341 having the refractive index may allow a portion of the light to be output toward the color conversion media layer 330 again to thereby increase a light output efficiency. That is, the scattering layer 340 is formed below the color conversion media layer 330, such that an amount at which light emitting from the light source is totally reflected may be reduced.

Then, the red color conversion media layer 330R, the green color conversion media layer 330G are formed on the scattering layer 340.

In the red color conversion media layer 330R, blue color light supplied from the light assembly 500 is converted into red color light. To this end, the red color conversion media layer 330R includes a red phosphor, and the red phosphor may be at least one material of (Ca, Sr, Ba)S, (Ca, Sr, Ba)$_2Si_5N_8$, CASN(CaAlSiN$_3$), CaMoO$_4$, and Eu$_2Si_5N_8$.

In the green color conversion media layer 330G, blue color light supplied from the light assembly 500 is converted into green color light. The green color conversion media layer 330G includes a green phosphor, and the green phosphor may be at least one material of yttrium aluminum garnet (YAG), (Ca, Sr, Ba)$_2SiO_4$, SrGa$_2S_4$, αα-SiAlON, ββ-SiAlON, Ca$_3Sc_2Si_3O_{12}$, Tb$_3Al_5O_{12}$, BaSiO$_4$, CaAlSiON, and (Sr$_{1-x}$Ba$_x$)Si$_2O_2N_2$.

In addition, the red color conversion media layer 330R and the green color conversion media layer 330G may include a quantum dot 331 in which color is changed according to a size.

As shown in FIG. 3, as compared to FIG. 2 there is no blue color conversion media layer, and the white color conversion layer (not shown) may be formed of only the scattering layer 340. In this case, blue color light is supplied from the light assembly 500. The blue color light supplied from the light assembly 500 passes through the scattering layer to show the blue color light having improved light output efficiency.

In another example embodiment, the white color conversion layer may be formed of a transparent polymer, and the blue color light supplied from the light assembly 500 is transmitted to show the blue color.

Figure 4:
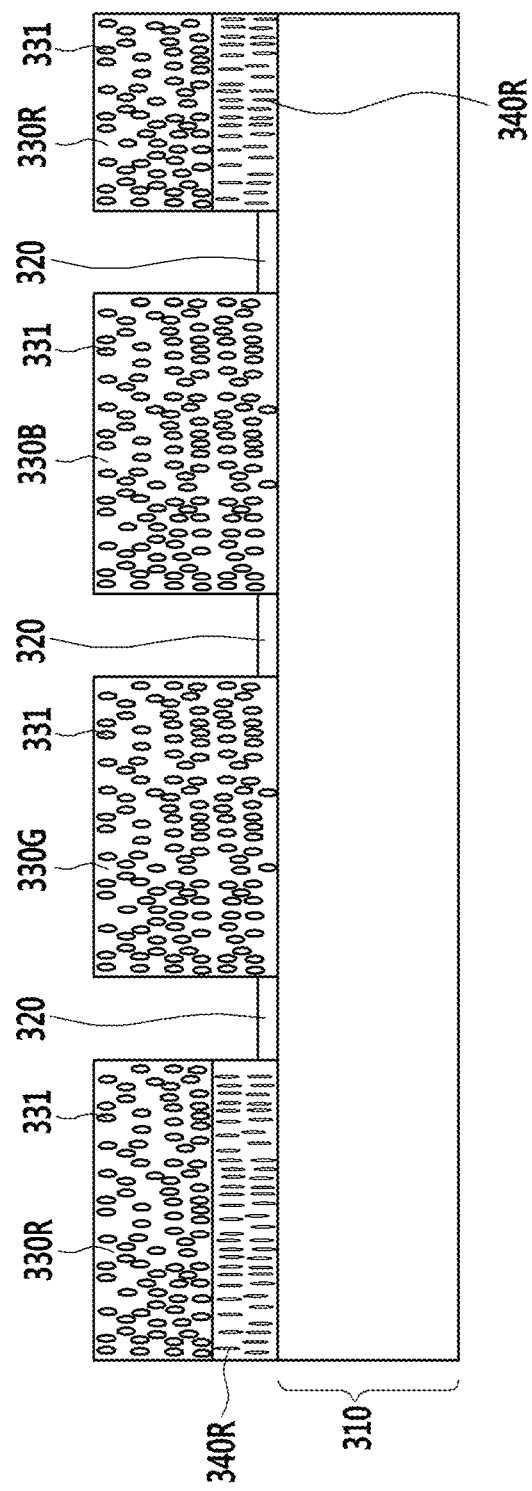

FIG. 4 is a cross-sectional view of the color conversion layer according to another example embodiment. The color conversion layer shown in FIG. 4 has the same configuration as the above-described example embodiment except that the scattering layer 340R is formed only below the red color conversion media layer 330R. The scattering layer 340 may be formed below at least one color conversion media layer selected from the group consisting of the red color conversion media layer 330R, the green color conversion media layer 330G, and the blue color conversion media layer 330B. The color conversion layer of FIG. 4 includes the light blocking member 320 formed between the scattering layer 340R and the green color conversion media layer 330G or among the plurality of color conversion media layers 330R, 330G, and 330B.

Figure 5:
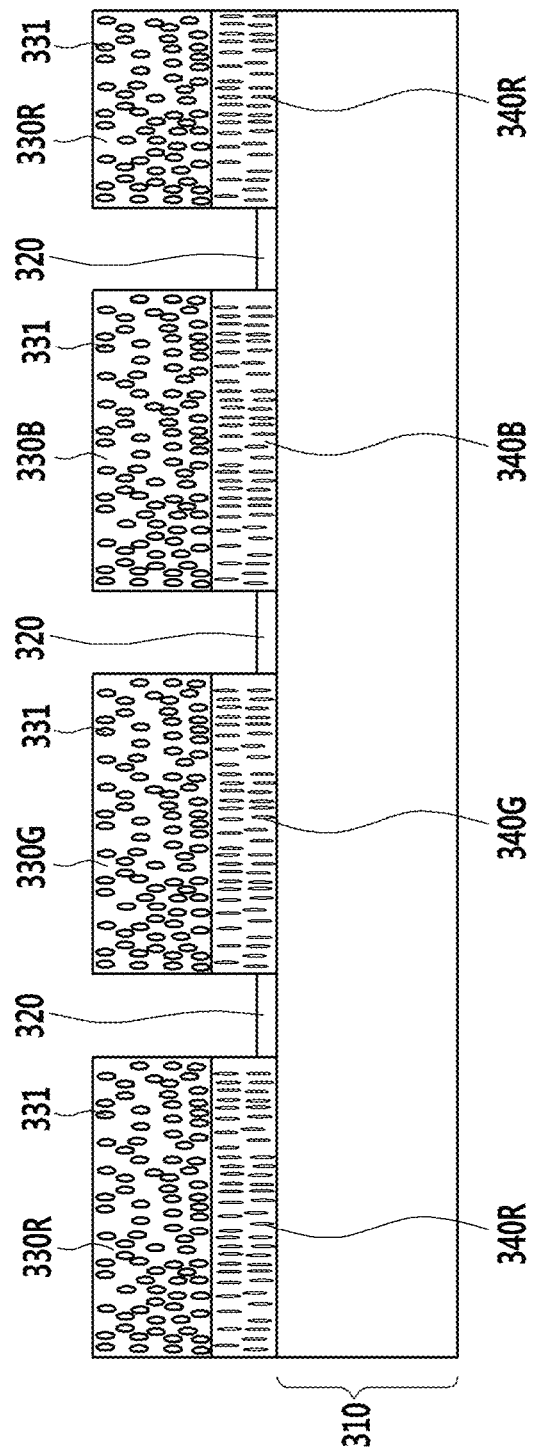

FIG. 5 is a cross-sectional view of the color conversion layer according to an example embodiment. As shown in FIG. 5, the scattering layers 340R, 340G, and 340B different from each other are positioned below the color conversion media layers 330R, 330G, and 330B, respectively. The color conversion layer of FIG. 5 includes the light blocking member formed between the plurality of scattering layers 340R, 340G, and 340B.

Hereinafter, a manufacturing method of the color conversion layer according to an example embodiment will be described with reference to FIGS. 6 to 9. FIGS. 6 to 9 are cross-sectional views showing a method of manufacturing the color conversion layer according to an example embodiment of the present invention.

First, scatterers 341 are prepared. In addition, a photosensitive resin including the red or green phosphor (or quantum dot) is prepared. Meanwhile, the photosensitive resin for manufacturing the blue color conversion layer may not include the phosphor or the quantum dot. The photosensitive resin and the scatterers 341 onto which dye is adsorbed as prepared above are dispersed to prepare a photosensitive resin for manufacturing the color conversion media layer.

Figure 6:
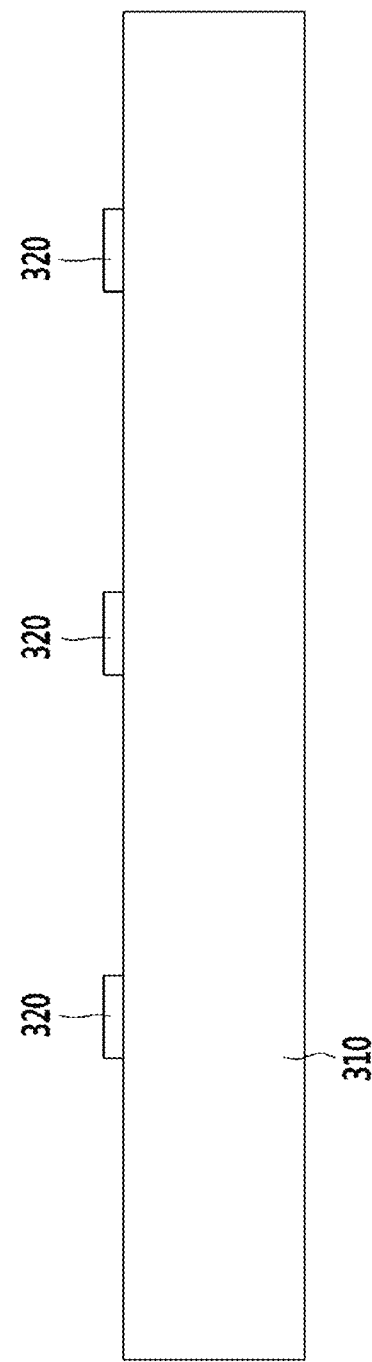
FIGS. 6, 7, 8, and 9 are cross-sectional views showing a method of manufacturing a color conversion layer according to an example embodiment.

As shown in FIG. 6, the light blocking members 320 are formed on the substrate 310. Regions in which the color conversion layers are to be formed are etched into a light blocking layer on substrate 310, to thereby form the light blocking members 320 spaced apart from each other by a predetermined interval.

Then, the photosensitive resin in which the scatterers 341 are dispersed is applied on the substrate 310 on which the light blocking members 320 are positioned.

Figure 7:
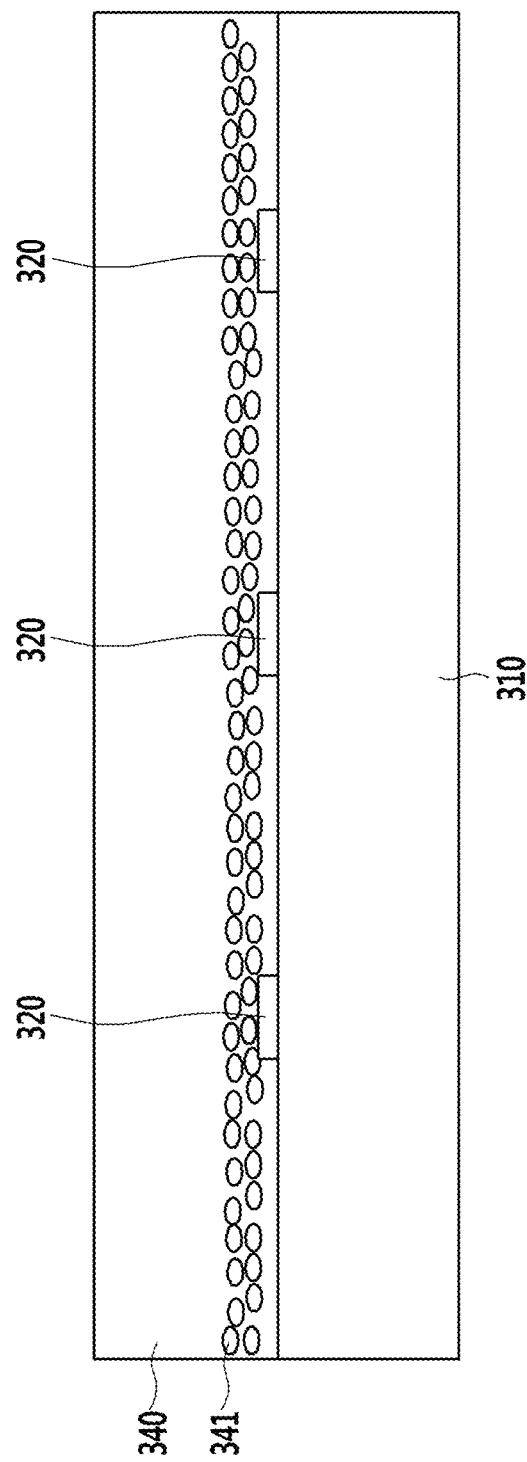

Then, after a predetermined time, as shown in FIG. 7, phases of the scatterers 341 dispersed in the photosensitive resin are separated on the substrate 310 according to a difference in density and a surface characteristic. The reason is because a general photosensitive resin has a density of about 1.1 to about 1.2 g/cm$^3$, and the scatterers 341 formed of titanium oxide according to an example embodiment has a density of about 4.3 g/cm$^3$.

In another example embodiment, the scattering layer 340 is patterned on the substrate 310 on which the light blocking members 320 are positioned, and then, the upper phase of the scattering layer 340 is patterned, to thereby form the scattering layer 340 and the color conversion media layer 330. The scattering layer may be formed only below the specific color conversion media layer through the patterning process.

Figure 8:
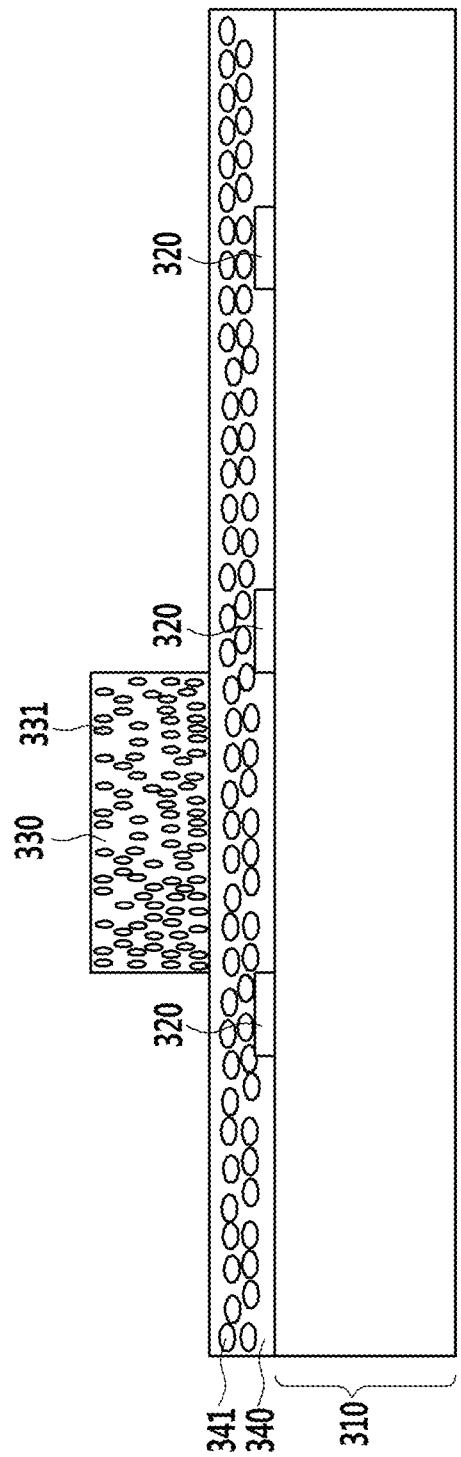
Figure 9:
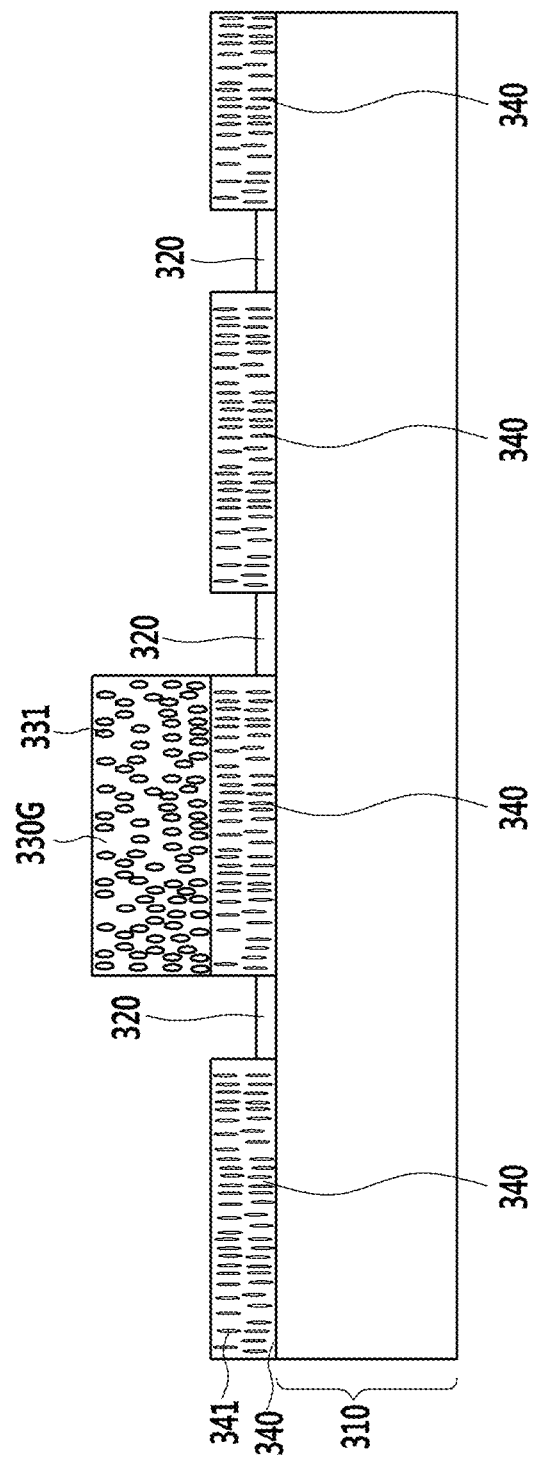

As shown in FIG. 8, only the color conversion media layer 330 may be etched by photolithography method using the light blocking members 320 as a mask. Alternatively, as shown in FIG. 9, the color conversion media layer 330 and the scattering layer 340 formed below the color conversion media layer 330 may be etched so as to expose the light blocking member 320.

Although the color conversion media layer and the scattering layer formed by the photolithography method are described, the present invention is not limited thereto and a printing method or other methods may be used to form the layers. The present invention is not limited in view of a manufacturing method.

Figure 10:
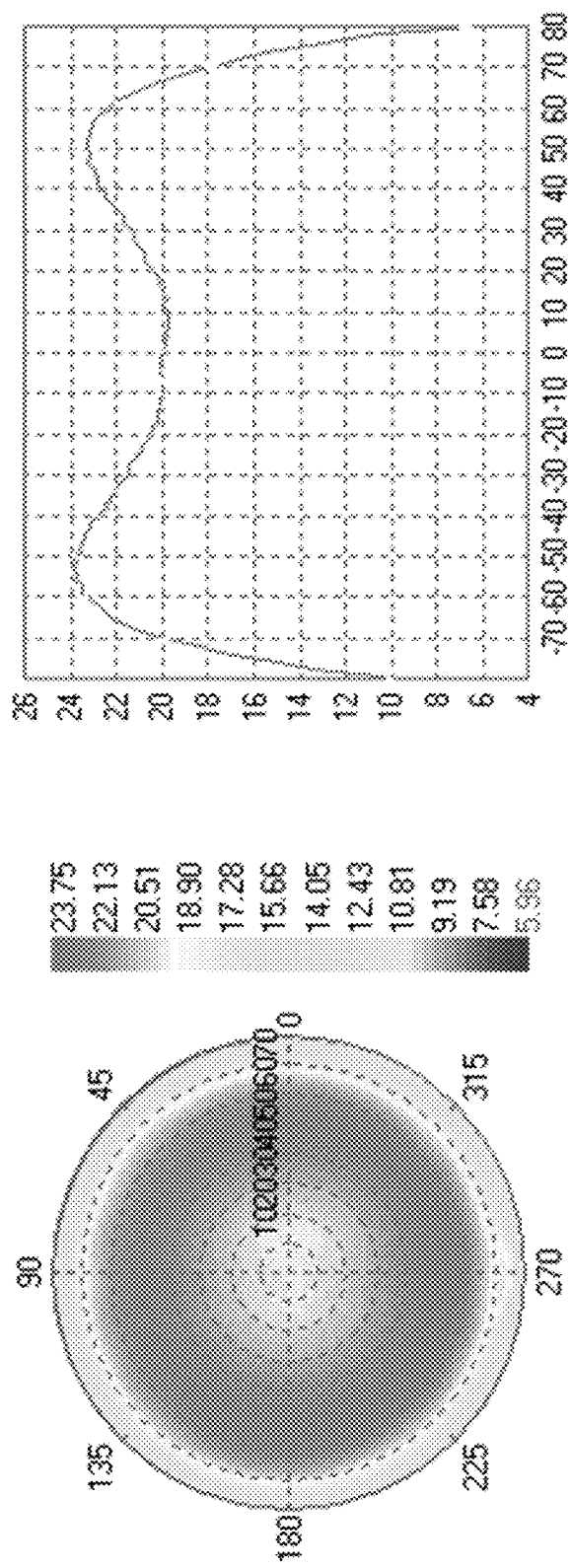
FIGS. 10, 11, and 12 are images showing a change in color on front/side surfaces and a change in luminance according to Comparative Examples and Examples.
Figure 11:
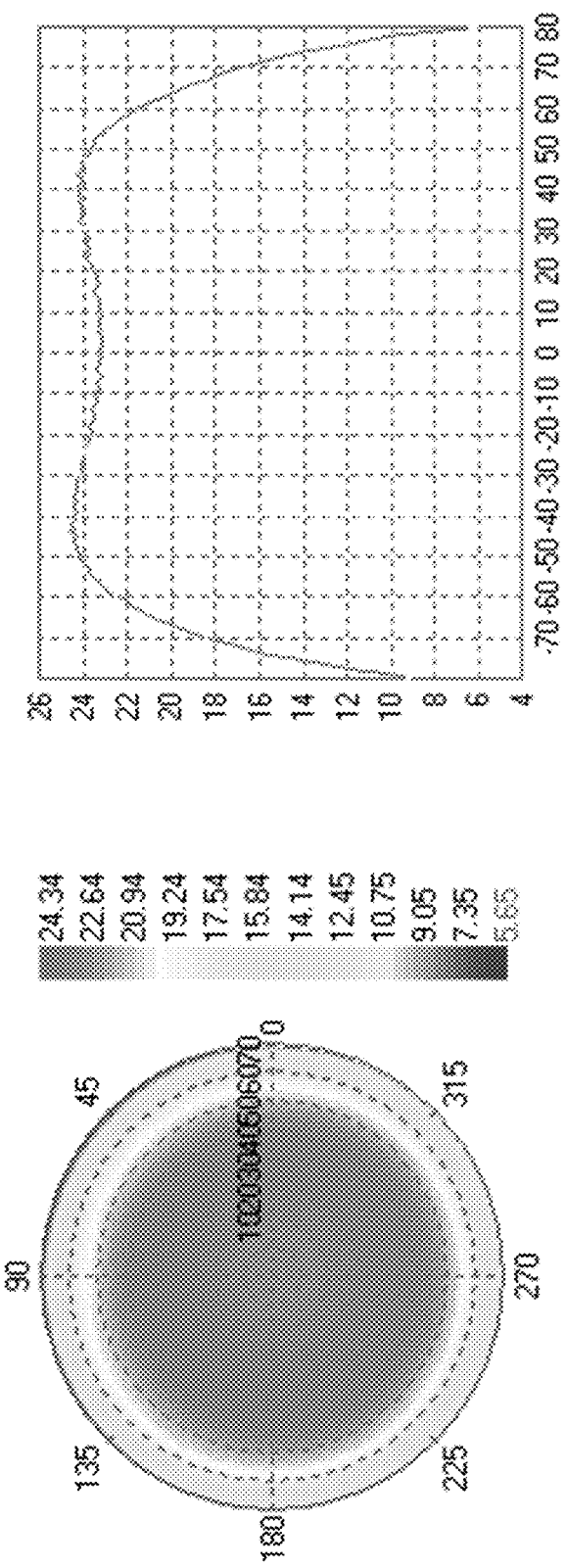

Hereinafter, referring to FIGS. 10 and 11, a front output light amount and output light distribution of the liquid crystal display according to an example embodiment are described. FIGS. 10 and 11 are images showing a change in color on front/side surfaces and a change in luminance according to Comparative Examples and Examples.

First, FIGS. 10 and 11 are Comparative Examples, showing images of a change in color on front/side surfaces and a change in luminance of the liquid crystal display in which the scattering layer is not formed below the color conversion layer.

Specifically, referring to FIG. 10, it may be appreciated that the change in a luminance between the front surface and the side surface has a large difference. Due to the abnormal light distribution phenomenon (Non-Lambertian), a difference in color between the front surface and the side surface occurs, such that visibility is remarkably deteriorated.

FIG. 11 is an image showing a change in color on front/side surfaces and a change in luminance when the color conversion layer has a significantly increased thickness in order to reduce the abnormal light distribution phenomenon (Non-Lambertian) of FIG. 10. As shown in FIG. 11, when the color conversion layer has a predetermined thickness or more, the change in luminance at a high angle is small, such that a difference in luminance of the front surface/the side surface is decreased. However, this is a result from a difference in light path by forming the color conversion layer to have a predetermined thickness or more, such that problems occur in that only the front luminance is increased and cost is increased.

Figure 12:
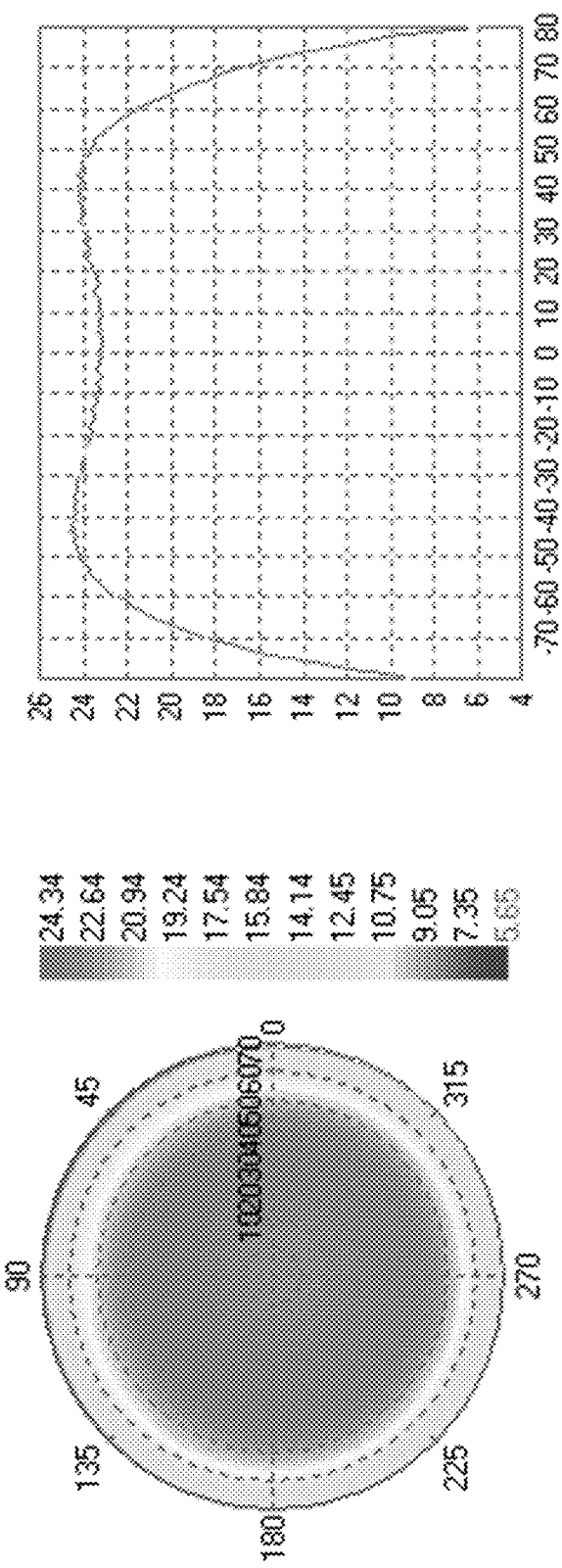

Next, FIG. 12 is an Example according to an embodiment of the present disclosure and it may be appreciated that the color conversion layer has a thin thickness and shows distribution close to the Lambertian light distribution of FIG. 11.

Hereinafter, the results are described in more detail with reference to Table 1 below.

TABLE 1

| Classification | Scattering Layer | Output Light Rate | Increasing Rate |
|---|---|---|---|
| Comparative Example (No Scattering layer Exists) | — | 11% | — |
| Example (Scattering layer Exists) | 10 vol % | 18% | 166% |
| | 20 vol % | 19% | 167% |

In the, the scattering layer was not included, and a light output ratio was about 11%.

The color conversion layers including the scattering layer according to the Example of the present disclosure had an output light rate of 18% and 19%, respectively. That is, it may be appreciated that the light output ratio of the Example is improved as compared to that of the Comparative Examples without including the scattering layer. In addition, as a result obtained by confirming an increasing rate as compared to the Comparative Example, it was confirmed that the light output ratio was increased by about 66% and 67%. Therefore, it was confirmed that the liquid crystal display according to the Example of the present disclosure had a thin thickness of the color conversion layer, improved light output ratio, and excellent color reproducibility to provide excellent display quality.

While embodiments have been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

| <Description of symbols> | |
|---|---|
| 10: display panel | 11, 12: polarizing plate |
| 30: color conversion layer | 310: substrate |
| 330: color conversion media layer | 340: scattering layer |

What is claimed is:

1. A display comprising:
a substrate;
a light blocking member disposed on the substrate;
a color conversion layer disposed on the substrate; and
a high refractive layer disposed on the color conversion layer, the high refractive layer having a refractive index larger than that of the color conversion layer,
wherein the color conversion layer includes:
a red color conversion layer, a green color conversion layer, and a blue color conversion layer, the red color conversion layer and the green color conversion layer each including quantum dots and each configured to convert a wavelength of a light,
wherein an entirety of the high refractive layer overlaps only one of the red color conversion layer, the green color conversion layer, and the blue color conversion layer, and the high refractive layer does not overlap the other of the red color conversion layer, the green color conversion layer, and the blue color conversion layer, and
wherein a thickness of the high refractive layer is larger than a thickness of the light blocking member.

2. The display of claim 1, wherein:
the high refractive layer has a refractive index of about 1.6 or more.

3. The display of claim 1, wherein:
the high refractive layer includes scatterers and the scatterers includes at least one selected from a group consisting of $TiO_2$, $ZrO_2$, $Al_2O_3$, $In_2O_3$, ZnO, $SnO_2$, $Sb_2O_3$, and ITO.

4. The display of claim 1, further comprising a display panel overlapping the substrate, wherein light emitted from the display panel is directed toward the color conversion layer.

5. The display of claim 1, wherein:
the color conversion layer further includes the light blocking member positioned between adjacent red color conversion layers, adjacent green color conversion layers, or adjacent blue color conversion layers.

6. The display of claim 1, wherein light passing through the color conversion layer without converting a wavelength of the light is scattered to the color conversion layer again by the high refractive layer.

7. The display of claim 1, wherein the display does not include a reflection wall positioned between adjacent red color conversion layers, adjacent green color conversion layers, and adjacent blue color conversion layers.

8. The display of claim 1, wherein the substrate is a first substrate on which transistors are disposed,
wherein the display further comprises a second substrate overlapping the first substrate, and
wherein the color conversion layer is disposed between the first substrate and the second substrate.

9. A display comprising:
a substrate;
a color conversion layer disposed on the substrate and including a red color conversion layer and a green color conversion layer, the red color conversion layer and the green color conversion layer each including a quantum dot and each configured to convert a wavelength of a light;

a first high refractive layer and a second high refractive layer on the substrate and separated from each other, each of the first high refractive layer and the second high refractive layer having a refractive index larger than that of the color conversion layer; and a light blocking member disposed between the first high refractive layer and the second high refractive layer, wherein a thickness of the first high refractive layer is substantially equal to a thickness of the second high refractive layer, and a thickness of the light blocking member is less than each of the thickness of the first high refractive layer and the thickness of the second high refractive layer, and wherein an entirety of the first high refractive layer overlaps one of the red color conversion layer and the green color conversion layer, and an entirety of the second high refractive layer overlaps the other of the red color conversion layer and the green color conversion layer.

10. The display of claim 9, wherein the first high refractive layer and the second high refractive layer are spaced apart from each other.

11. The display of claim 9, wherein the light blocking member does not overlap the first high refractive layer and the second high refractive layer.

12. The display of claim 9, wherein the red color conversion layer and the green color conversion layer respectively overlap the first high refractive layer and the second high refractive layer.

13. The display of claim 12, wherein a distance between the red color conversion layer and the green color conversion layer is substantially a same as a distance between the first high refractive layer and the second high refractive layer.

14. The display of claim 12, further comprising:

a third high refractive layer separated from the first high refractive layer and the second high refractive layer wherein the color conversion layer further includes a blue conversion layer overlapping the third high refractive layer.

15. The display of claim 9, wherein:

each of the first high refractive layer and the second high refractive layer has a refractive index larger than that of the color conversion layer.

16. The display of claim 9, wherein:

each of the first high refractive layer and the second high refractive layer includes scatterers and the scatterers includes at least one selected from a group consisting of $TiO_2$, $ZrO_2$, $Al_2O_3$, $In_2O_3$, $ZnO$, $SnO_2$, $Sb_2O_3$, and ITO.

17. The display of claim 9, wherein the substrate is a first substrate on which transistors are disposed, wherein the display further comprises a second substrate overlapping the first substrate, and wherein the color conversion layer disposed between the first substrate and the second substrate.

* * * * *